Patented Aug. 26, 1924.

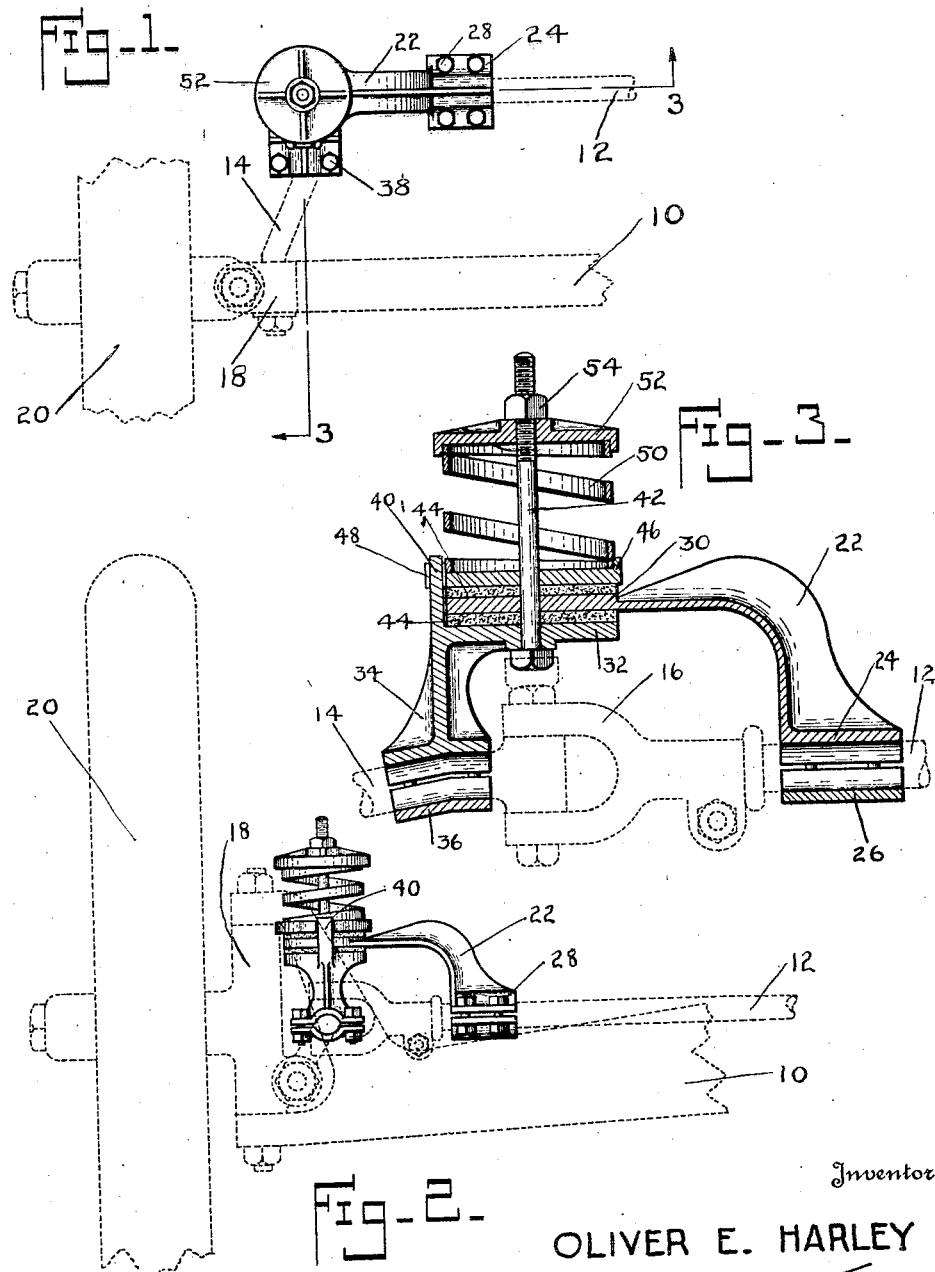

1,506,176

UNITED STATES PATENT OFFICE.

OLIVER E. HARLEY, OF LOUISVILLE, KENTUCKY.

STEERING-ROD ATTACHMENT.

Application filed June 11, 1923. Serial No. 644,548.

*To all whom it may concern:*

Be it known that I, OLIVER E. HARLEY, a citizen of the United States, residing at Louisville, in the county of Jefferson and State of Kentucky, have invented certain new and useful Improvements in Steering-Rod Attachments; and I do hereby declare the following to be a full, clear, and exact description of the invention, such as will enable others skilled in the art to which it appertains to make and use the same.

This invention relates to improvements in steering-rod attachments, particularly for automobiles, and is especially adapted for application to the Ford car.

The principal object of this invention is the provision of an attachment for the steering-rod and steering-knuckle connections of an automobile, especially a Ford, which will act to positively eliminate the excessive and objectionable vibration which sometimes becomes evident in the steering apparatus of these cars, and also in other makes.

Another important object of the invention is the provision of an attachment for the steering apparatus of an automobile which will act to make the steering of said automobile more positive, and which will eliminate, in a great degree, the transmission of shocks and twists to the steering wheel of the automobile, which very often result when the front wheels of the car come into contact with bumps in the road, obstructions or the like, especially where the irreversible type of steering gear is not employed.

Another and further important object of this invention is the provision of a steering rod attachment for automobiles which is so constructed that it will be interchangeable and will be adapted to be readily applied to either one or both ends of the rod forming part of the steering apparatus, which connects the spindle-arms of the front wheels.

Still another and further important object of the invention is the provision of a shock absorbing attachment for the steering-knuckles of automobiles, which will be simple of construction, composed of a minimum of parts, easily applied, and which will also be susceptible of adjustment, so that the degree of its action may be regulated as desired.

Other and further important objects of the invention will be apparent from the disclosures in the accompanying drawings and following specification.

The invention, in a preferred form, is illustrated in the drawings and herinafter more fully described.

In the drawings:—

Figure 1 is a top plan view of the improved steering-rod attachment of this invention, portions of the automobile to which it is applied being illustrated in dotted lines.

Figure 2 is a front elevation of the steering-rod device of the invention.

Figure 3 is a cross-sectional view of the same taken on the broken line 3—3 of Figure 1, looking in the directions indicated by the respective arrows.

As shown in the drawings:—

The reference numeral 10 indicates generally the front axle of an automobile which is illustrated as of the Ford type, but which obviously may be a portion of any other automobile without departing from the spirit of this invention.

Directly behind the axle 10 is the spindle-arm connecting-rod 12, which extends parallel therewith, as is usual in these constructions. A spindle-arm 14 has one end rotatably attached to the usual U shaped connecting joint 16, adjustably mounted on the end of the connecting-rod 12. The forward end of the spindle-arm 14 passes into the spindle 18 of the wheel 20, all of which construction is old and forms no part of the present invention, except inasmuch as it is auxiliary thereto.

The steering-rod attachment of this invention comprises essentially an arm 22, having a base 24 with which is adapted to co-operate a removable base plate 26. The inner faces of the base 24 and of the base plate 26 are recessed to correspond to the circular cross-section of the connecting-rod 12, and bolts 28 are provided which pass through suitable openings in the plates and are adapted to securely connect the same together and grip the connecting rod 12.

The arm 22 is provided with an integral outwardly extending circular plate 30 which has a hole passing through the center thereof. Adapted to co-operate with this plate is a corresponding plate 32 formed integral with a frame member 34, which is adapted to be connected to the spindle-arm 14 by means of a plate 36 and bolts 38 in a manner similar to the connection between the arm 22 and the connecting-rod 12. The frame 34 is provided with an integral upstanding projection 40, as best shown in Figures 2 and 3, and is adapted to insure co-operation between the respective elements.

A bolt 42 passes upwardly through a suitable opening in the center of the bottom plate member 32 and also through the opening in the plate 30. Gaskets 44 are provided on each side of the plate 30, which gaskets are composed of some suitable material, as fiber or the like, which will act as a frictional and cushioning element between the plates. An upper plate 46 is provided having an opening in its center through which the bolt 42 passes, and is positioned directly upon the uppermost gasket 44. A notch 48 is formed in an extension in one side of the plate 46 and into this notch fits the extension 40. A helical spring 50 has its lower end fitted into an annular rim integral with the plate 46, and has its upper end similarly fitted into an annular rim integral with a top plate 52, as illustrated in the drawings. A nut 54 is positioned upon the threaded end of the bolt 42, by which the degree of tension of the spring 50 may be adjusted, thereby varying the friction between the plates 30, 32 and 46 and the pressure on the gaskets 44. Any suitable locking means may be provided for retaining the nut 54 in position.

It will be seen that herein is provided an auxiliary element for steering-knuckles which will insure a positive operation between the connecting-rod and the spindle-arm of steering devices for automobiles, and which will result in a more positive and effective guidance of the automobile by means of the steering wheel. It will also serve to eliminate all objectionable vibrations or rocking of both the front wheels of the car, and will moreover effectively prevent vibration or chattering of the steering wheel.

I am aware that many changes may be made and numerous details of construction varied throughout a wide range without departing from the principles of this invention, and I, therefore, do not purpose limiting the patent granted hereon, otherwise than as necessitated by the prior art.

I claim as my invention:—

1. A steering-rod attachment including an arm having one end adapted to grip the connecting-rod of a steering apparatus and a plate integral with the other end of said arm and overhanging the steering connection, a member adapted to grip the spindle-arm of the steering device, a plate integral with said member and adapted to co-operate with the plate on the aforesaid arm, and resilient frictional means connecting said plates, said resilient frictional means including a set of friction plates, a spring acting on said plates, and a pivotal bolt, distinct from the steering knuckle bolt, fitted into concentric openings in said plates.

2. A steering-rod attachment including an arm having one end adapted to grip the connecting-rod of a steering apparatus and a plate integral with the other end of said arm and overhanging the steering connection, a member adapted to grip the spindle-arm of the steering device, a plate integral with said member and adapted to co-operate with the plate on the aforesaid arm, and resilient frictional means connecting said plates, said resilient frictional means including a set of friction plates, a pivotal bolt, distinct from the steering knuckle bolt, fitted into concentric openings in said plates, a helical spring surrounding said bolt and acting on said plates, and adjusting means on the end of the bolt to vary the tension of said spring.

In testimony whereof I affix my signature.

OLIVER E. HARLEY.